US012750448B2

(12) United States Patent
Trivedi et al.

(10) Patent No.: US 12,750,448 B2
(45) Date of Patent: Sep. 29, 2026

(54) ANOMALY DETECTION IN TELECOMMUNICATION NETWORKS FOR IoT AND CONNECTED CARS USING SESSION, VOLUMETRIC, AND APN DATA ANALYSIS

(71) Applicant: AT&T Intellectual Property I, L.P., Atlanta, GA (US)

(72) Inventors: Amee Trivedi, Amherst, MA (US); Yaron Koral, Cherry Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 222 days.

(21) Appl. No.: 18/430,949

(22) Filed: Feb. 2, 2024

(65) Prior Publication Data

US 2025/0254242 A1 Aug. 7, 2025

(51) Int. Cl.
*H04M 15/00* (2024.01)

(52) U.S. Cl.
CPC ........... *H04M 15/60* (2013.01); *H04M 15/44* (2013.01); *H04M 15/8214* (2013.01); *H04M 15/8228* (2013.01)

(58) Field of Classification Search
CPC .. H04M 15/60; H04M 15/44; H04M 15/8214; H04M 15/8228
See application file for complete search history.

(56) References Cited

U.S. PATENT DOCUMENTS

| | | | | |
|---|---|---|---|---|
| 11,418,642 B1 * | 8/2022 | Wicker | ................. | H04M 15/41 |
| 2019/0020757 A1 * | 1/2019 | Rao | ..................... | H04M 7/0078 |

* cited by examiner

*Primary Examiner* — Justin Y Lee
(74) *Attorney, Agent, or Firm* — Guntin & Gust, PLC; Andrew Gust

(57) ABSTRACT

Aspects of the subject disclosure may include, for example, retrieving call detail record (CDR) data for a plurality of devices, each device of the plurality of devices using a subscriber identity module (SIM) to access a mobility network, identifying data anomalies for the plurality of devices, wherein the identifying the data anomalies is based on the CDR data, wherein the data anomalies may be indicative of inappropriate usage of the mobility network, identifying a device associated with a data anomaly, and initiating a modification of the device to prevent subsequent anomalies. Other embodiments are disclosed.

20 Claims, 12 Drawing Sheets

244

100

200

244

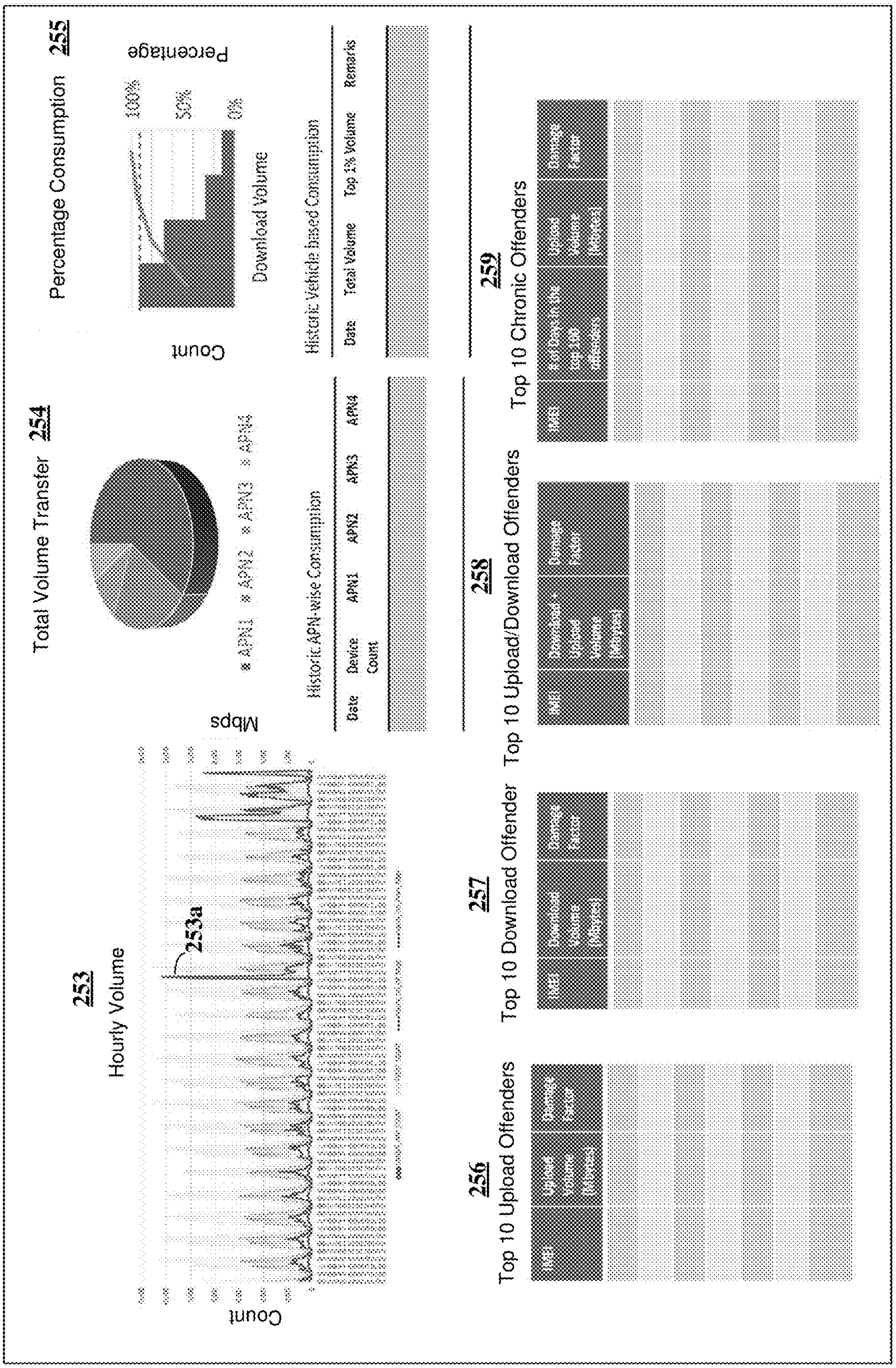
252 FIG. 2D

260

271

300

600

ANOMALY DETECTION IN TELECOMMUNICATION NETWORKS FOR IoT AND CONNECTED CARS USING SESSION, VOLUMETRIC, AND APN DATA ANALYSIS

FIELD OF THE DISCLOSURE

The subject disclosure relates to a system and a method for detecting anomalous activity in telecommunication networks accessed by devices such as connected vehicles and Internet of Things devices.

BACKGROUND

The rapid expansion of telecommunication networks, the proliferation of internet of things (IoT) devices, and the rise of connected vehicles have led to an unprecedented increase in data generation and network traffic on mobility networks supporting these devices. This increase has resulted in the need for efficient and accurate methods for detecting anomalies in various aspects of these networks to maintain network reliability, ensure accurate billing, and protect against fraudulent activities.

BRIEF DESCRIPTION OF THE DRAWINGS

Reference will now be made to the accompanying drawings, which are not necessarily drawn to scale, and wherein:

FIG. 2D is an exemplary, non-limiting embodiment of a user display and report for informing users about an anomaly detection process performed by the system of FIG. 2C.

DETAILED DESCRIPTION

The subject disclosure describes, among other things, illustrative embodiments for processing data from communication sessions between devices such as connected vehicles and a mobility network to identify anomalous behavior that may correspond to possible fraudulent or improper activities and reporting the anomalous behavior to a user to take corrective action. Other embodiments are described in the subject disclosure.

One or more aspects of the subject disclosure include retrieving call detail record (CDR) data for a plurality of devices, each device of the plurality of devices using a subscriber identity module (SIM) to access a mobility network, identifying data anomalies for the plurality of devices, wherein the identifying the data anomalies is based on the CDR data, wherein the data anomalies may be indicative of inappropriate usage of the mobility network, identifying a device associated with a data anomaly, and initiating a modification of the device to prevent subsequent anomalies.

One or more aspects of the subject disclosure include retrieving, from a database, session data for a plurality of communication sessions between connected vehicles of a fleet of connected vehicles and a mobility network, each connected vehicle including a subscriber identity module (SIM) to enable communication with the mobility network, identifying, in the session data, one or more data anomalies, the data anomalies being indicative of potential inappropriate use of the mobility network, producing a visual report indicating information about the one or more data anomalies for a user associated with the fleet of vehicles, and initiating a procedure to modify a SIM associated with the one or more data anomalies to prevent subsequent data anomalies.

One or more aspects of the subject disclosure include accessing a repository of call detail record data for a group of devices, wherein devices of the group of devices are configured for radio communication with a mobility network, wherein the call detail record data includes information about communication sessions between a device and the mobility network, identifying one or more of a session anomaly, a volumetric anomaly and an access point network (APN) anomaly based on the call detail record data for the group of devices, and formatting a user display for reporting information about the session anomaly, the volumetric anomaly, or the APN anomaly.

Figure 1:
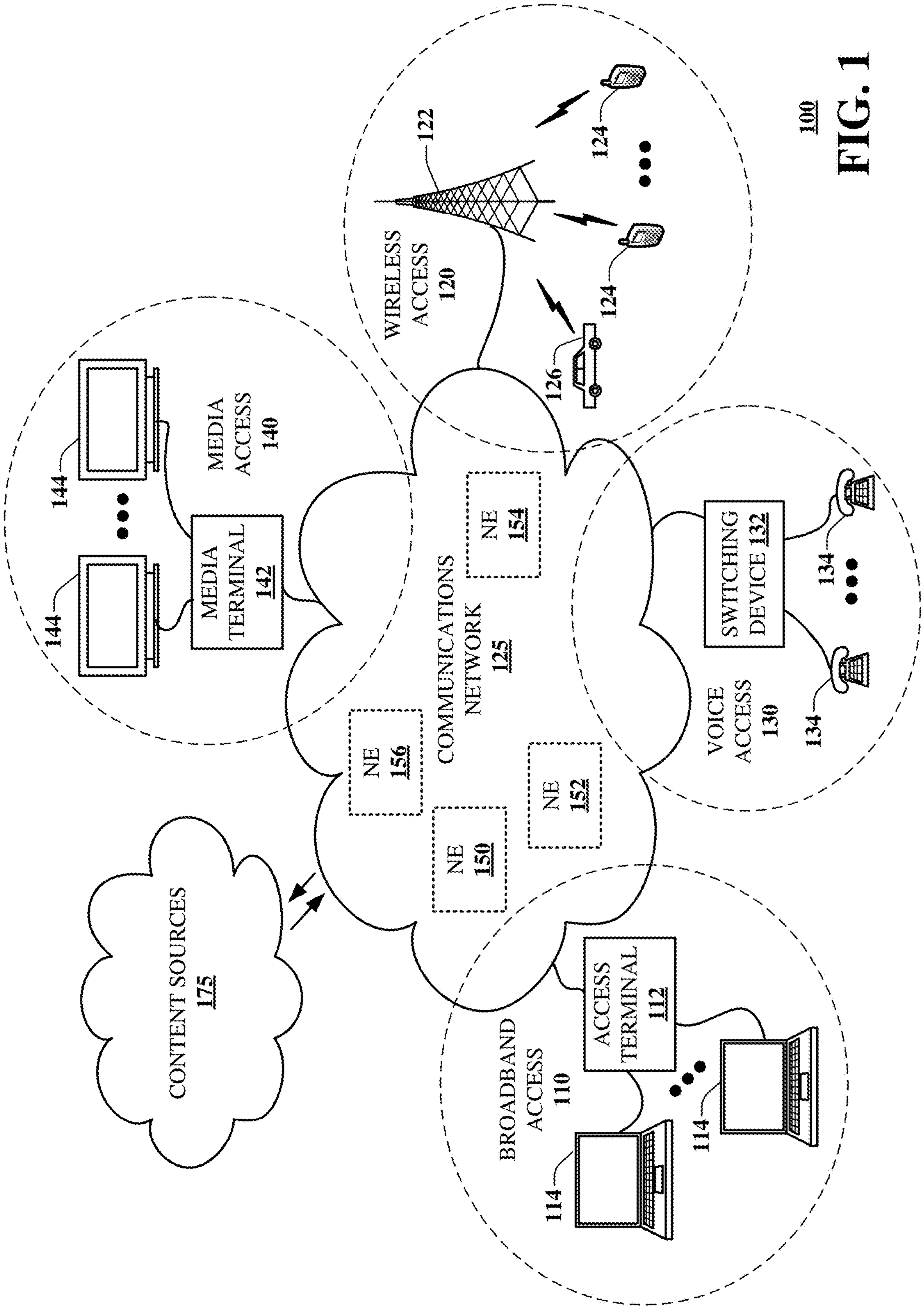
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part identifying anomalous behavior based on communication session data collected from communications in the system 100. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Portions of the communications network 125 may be used in conjunction with connected vehicles or, more broadly, Internet of Things devices. Connected vehicles can communicate data with other equipment and vehicles. The communication is generally by radio transmission and reception. The data may be related to services for passengers, such as music, navigation information and other internet data. The data may be related to vehicle functionality including self-driving abilities, such as coordination with other vehicles and receiving updated information such as traffic information. Connected vehicles may be considered a subset of Internet of Things (IoT) devices which generally include sensors, processing abilities and the ability to communicate with other devices and systems over networks including the internet.

Connected vehicles include personal vehicles and fleet-operated vehicles with a common owner. Connected vehicles may include automobiles and trucks as well as specialty vehicles such as tractors and other agricultural vehicles, watercraft and aircraft. IoT devices may include wireless sensors, control systems, automation devices such as home automation and building automation, and appliances and security systems.

The connected vehicles and IoT devices generally are configured for data communication on a network such as the mobility network 202. Each connected vehicle or IoT device may include a subscriber identify module (SIM) and radio circuitry such as a modem for radio communication with the mobility network 202. The SIM associates an account of the mobility network 202 with a particular connected vehicle or a particular IoT device for tracking usage, billing and other functions. In example usage, the connected vehicle may report metric information about vehicle performance and capabilities to network equipment of the manufacturer of the vehicle. Further, the manufacturer may use connected vehicle connectivity to update software and other features of the connected vehicle. To facilitate this process, the manufacturer may designate one or more access point names (APNs) of the mobility network for communication with its connected vehicles or IoT devices. Other services use this connectivity such as entertainment, for a Wi-Fi hotspot established in the connected vehicle, and others. Examples of IoT devices include connected home security systems and connected utility meters that include a sensor, actuator or device and maintain connectivity with the mobility network 202 using a SIM.

In some cases, anomalous behavior has occurred in a mobility network. Such anomalous behavior can take many forms. In a first example, labelled volumetric anomalous behavior, the amount of data transmitted or received by a particular device or group of device shows inconsistent or irregular patterns. In a second example, labelled session anomalous behavior, the duration or termination of a session between a device and a network shows inconsistent or irregular patterns. In a third example, labelled APN anomalous behavior, the access point name or APN which a connected vehicle or IoT device accesses may not match a designated APN for that vehicle or that device.

Such anomalous behavior can indicate potential operational issues or unusual activities in the mobility network or other telecommunication network. One potential issue is fraudulent activity. Such fraudulent activity may include unauthorized access, call hijacking, or other malicious activities that exploit the telecommunication system to make unauthorized calls or sessions. A second potential issue relates to issues of network performance by the mobility network, including connection problems, dropped calls, or poor call quality, which can be caused by faulty equipment, network congestion, or misconfigurations. A third potential issue relates to discrepancies in billing for services by the network operator. Inaccurate or inconsistent billing information may be stored within call record information, which may result from system errors or data corruption. A fourth potential issue relates to unusual usage patterns. These may include significant deviations from typical call or session patterns, such as an unexpected spike in call volume or duration, which may indicate a system issue or an emerging trend.

Figure 2A:
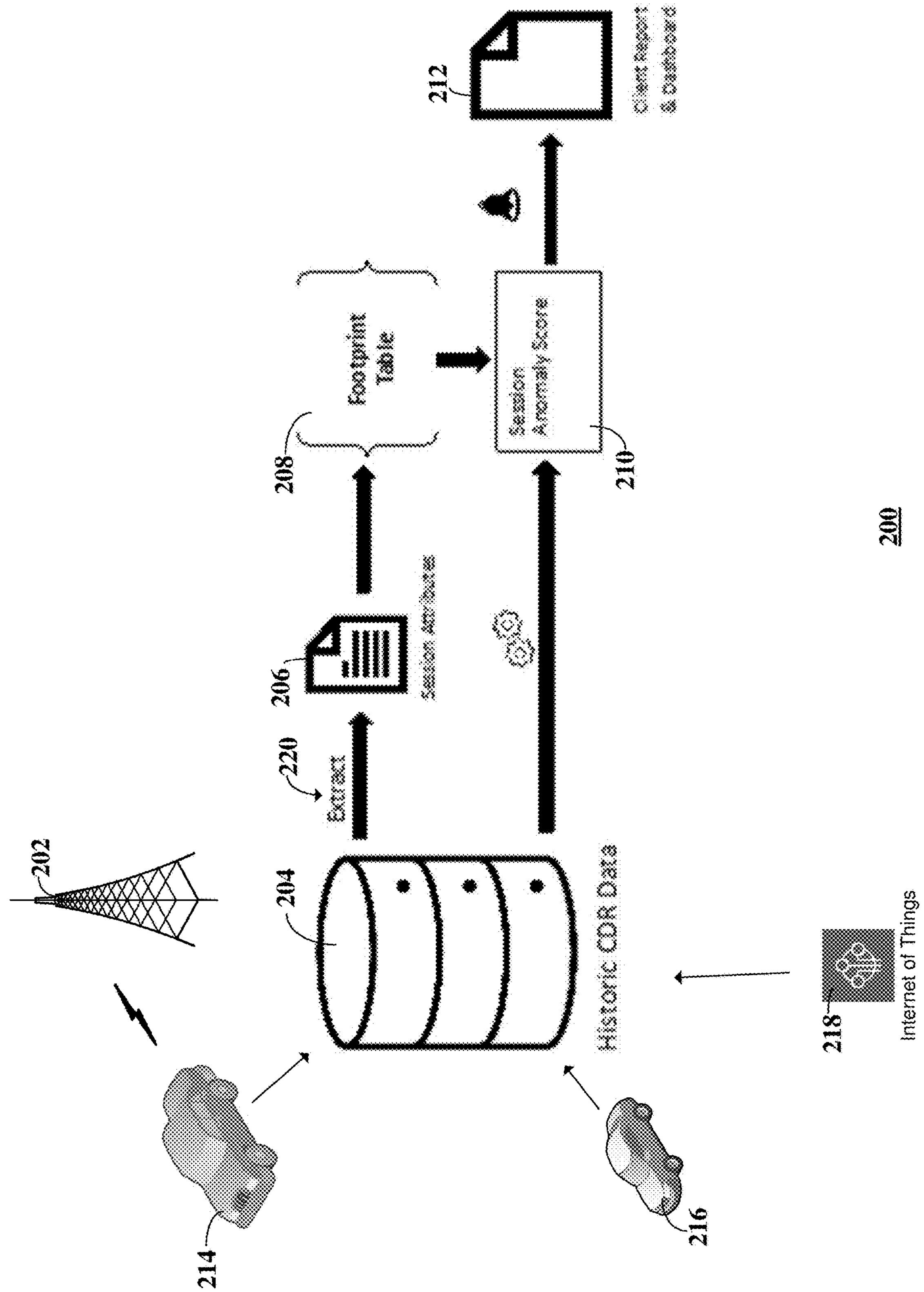
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 may be used for anomaly detection in a mobile communication network or mobility network 202 such as the wireless access 120 of FIG. 1. In particular, the system 200 may be used for session anomaly detection in a wireless communication network. The system 200 includes a call data record (CDR) repository 204, a session attributes module 206, a footprint table 208, a session anomaly score module 210 and a client reporting module 212.

The CDR repository 204 stores call data records from users accessing the mobility network 202. The mobility network 202 may be any suitable network for data and voice communication. In example embodiments, the mobility network 202 implements a fourth-generation cellular network, referred to as 4G or LTE, a fifth generation cellular network, referred to as 5G, or other similar or follow-on network. The mobility network provides mobile communications to subscribers including connected vehicles such as vehicle 214, vehicle 216 and internet of things (IoT) devices such as IoT device 218.

Network devices such as vehicle 214, vehicle 216 and IoT device 218 obtain communications connectivity over mobility network 202 operated by a mobile network operator or carrier. In an example, the vehicle 214 may have access over the mobility network 202 to any network components including the public internet, for example, by means of the wireless access 120 of FIG. 1. The vehicle 214 communicates with various network equipment such as carrier billing system and core network equipment such as mobility management systems. Network devices such as vehicle 214, vehicle 216 and IoT device 218 generally include a SIM and radio communication circuitry to enable communication with the mobility network 202. Each such communication is according to a subscription or other arrangement with the operator of the mobility network. Each such communication may be considered a call or a data session or a session.

The CDR repository 204 collects and stores daily call data record information for sessions from the mobility network 202. Each time a user or device initiates a call or receives a call or even attempts a call or data session with the mobility network 202, the network operator of the mobility network 202 creates a new record associated with the call. CDR information includes information about calls or data sessions (generally referred to as calls) made on the mobility network 202. Each call may be a voice call or a data-only call. Each CDR may include information such as number of the calling party or A-party, number of the called party or B-party, date and time the call was made and duration of the call. Numbers for each device may include an assigned telephone number as well as an International Mobile Subscriber Identity (IMSI) or International Mobile Equipment Identity (IMEI) as well as other identifiers for the device or the subscriber associated with the device. The CDR information may include other information such as identification of network equipment involved in processing the call, such as an originating base station, terminating base station, cell face or sector identification and intermediate switching equipment as well as an Access Point Name (APN) used by the call in the core network of the mobility network. If the call is not completed or is improperly terminated, that information may be included in CDR information. Any other suitable or useful information may be included in the CDR information, such as the number of bytes of data communicated between each mobile device and a base station, both on an uplink and on a downlink, and the QoS Class Identifier (QCI). The CDR information may include a cause for termination (CFT) code which provides an indication of the reasons the session was terminated, such as "session longer that one hour" or "data transmission larger than 16 Mb," or other cause.

In embodiments, the CDR information for each call or data session in the mobility network is collected and stored. Storage may be at any convenient network location, including a centralized repository such as CDR repository 204. The network operator may employ one or more components including software to automatically collect, process and store the CDR information. As noted, the CDR information in some embodiments is collected and processed daily. Any suitable frequency for data collection may be used. The data is also aggregated to various levels required for further processing and analysis (e.g., LOB, device type, QCI, face) to protect the privacy of individuals.

The system 200 may be used for identifying anomalous activity in the mobility network 202. In an example, each mobile device in the mobility network, including connected vehicles such as vehicle 214, vehicle 216 and internet of things (IoT) devices such as IoT device 218, may be equipped with software or a module or other component for monitoring activity by the mobile device including examining content for suspicious activity. The activity may be reported, for example, to the network operator or to a manufacturer of the vehicle. However, that may be difficult to implement based on issues of user privacy, ability to install such software on user devices, battery consumption in battery-powered devices, etc.

Instead, in embodiments, the network operator managing the mobility network 200 has access to substantially all radio communications from all devices registered on the network. Thus, call data records are available for substantially all activity. Moreover, signaling information, such as handover signaling from one base station to another, is available as well. Thus, the network operator has at hand a wealth of information enabling analysis of network activity and detection of network anomalies. Upon detection of a possible network anomaly by the network operator, the network operator can inform a user or customer such as a manufacturer of connected vehicles to enable further investigation and rectification.

However, the network operator has no access or limited access to the content communicated with a device because the content is typically encrypted. Further, a customer such as a connected vehicle manufacturer, IoT device provider or other, may have in place a very large number of devices such as connected vehicles or IoT devices. The devices may number in the millions, and the suspicious or anomalous activity may appear as noise against all the background activity by all these devices.

Accordingly, system 200 may be adapted for detection of session anomalies in network information. A session may be defined as a unit of communication. The system 200 detects a session between two participants that may have a shape or behavior that differs from other sessions between the two participants. Generally, a session begins when a user equipment (UE) device initiates a call or data session or responds to a page from the mobility network. Any amount of information may be communicated between the UE and the network. Subsequently, the session terminates, either normally in due course, or due to occurrence of a condition. Other sessions may include exchange of signaling information between the UE and the network, such as handover from one base station to another. In some cases, such a session may indicate anomalous behavior and therefore be flagged for further attention.

In embodiments, data in the CDR 204 are categorized in a variety of ways. For example, the CDR data may be categorized according to type of device, so that all CDR data associated with an informatics device associated with a particular model of a connected vehicle produced by a particular manufacturer are categorized together. Other CDR data from other informatics devices of other models by the same manufacturer are categorized separately. Similarly, other CDR data from informatics devices of vehicles of other manufacturers are categorized separately. CDR data from IoT devices may be handled and categorized similarly. Such categorization enables focused analysis and reporting on possible anomalies to the manufacturer, which may be a customer of the network operator, providing payment for the service.

In an initial extraction process 220, data of interest are extracted from the CDR repository 204. A traffic footprint may be computed for a suitable time period, such as daily, and maintained as traffic footprint table 208. Any suitable marker or combination of markers may be used to select the data of interest. For example, the IMEI may be used to select data for individual devices, or a serialization identifier associated with a particular customer or customer product such as a vehicle type may be used. Any other suitable technique or markers or tags may be used to identify particular data of interest among the CDR records in CDR repository 204. In another example, data is categorized according to session termination cause for a session. For example, the session may be terminated normally or the session may be interrupted for some reason, such as exceeding an amount of data permitted to be transferred during a session. The data of interest is collected as session attributes at session attributes module 206.

When the data of interest are identified, a probabilistic model may be developed for session anomaly detection, using the categorized traffic footprint of the footprint table 208. The probabilistic model may incorporate various factors such as rules for association of data, device types and manufacturer types For example, the footprint table 208 may be used to look at the distribution of the data over a historical period, such as the past 15 days, and determine how different the distribution is for a current time period, such as the current day, compared to the last 15 days. The historical time period is exemplary only. Any suitable time period may be used, and different time periods may be used for different types of data. Further, the historical time period may be expanded or contracted as appropriate, based on characteristics of the data for example. Similarly, the current time period may be any suitable time period, such as a particular 12-hour period or a particular week. Again, the current time period may be selected based on particular characteristics of the data of interest.

The data of interest may be processed in any suitable manner to identify anomalies. In an example, to identify session anomalies, historical data for a particular device such as a particular connected vehicle may be selected and processed. The duration of all sessions by the device may be retrieved and evaluated. An average duration may be determined over, for example, the selected historical time period (such as 15 days). Further, an average number of sessions for the particular device may be determined. In an example, the average duration may be quite short, such as 15 seconds, and the device may have an average of 20 data sessions per day. During each data session, data is transmitted from the device or to the device, or the device is otherwise active on the mobility network as recorded by CDR data in the CDR repository 204. Further, the process of analyzing the data includes identifying statistical modes and means of the current time period, such as the current day, and identifying differences from historical values for the historical data.

The differences between the statistics for the current time period and the statistics for the historical time period are compared and based on the comparing, a conclusion is drawn about anomalous data. For example, a difference in two values may be compared with a threshold value. Any suitable threshold or combination of thresholds may be selected to identify a particular vehicle that may be responsible for anomalous data. The threshold may be based on any suitable criteria, and the threshold may be variable.

The threshold is used to determine a session anomaly score for the device by session anomaly score module 210. The session anomaly score module 210 applies a probabilistic model to the CDR data to detect session anomalies in the CDR data. The session anomaly score may be an indication that the particular device is a potential source of anomalous data. If the session anomaly score exceeds a threshold, the device may be selected for further analysis. In general, devices which exceed one or more thresholds may be identified as meriting further consideration and analysis. Vehicles may be ranked by session anomaly score, or by any other factor or combination of factors. In an example, a threshold is set for a number of devices which are considered suspect. For example, for connected vehicles, the top 5 or 10 or 20 devices, ranked by anomaly score, are identified. Any suitable number of vehicles threshold may be used. The threshold may be specified by the customer, for example, such as a number of vehicles warranting investigation, or a percent of suspected vehicles warranting investigation based on anomalous data.

In general, the process of FIG. 2A operates on all device data for the current time period, such as the current day. In the case of device data from connected vehicles, data for a first vehicle is processed to determine if a data anomaly has likely occurred with that vehicle on the given date. As indicated, historical data may be used to make the determination. Subsequently, device data for a second vehicle is processed accordingly to determine if a data anomaly has likely occurred with that vehicle on the given date. The process continues until all vehicles, or a selected subset of vehicles, has been processed. For example, only data associated with a certain vehicle model or manufacturer may be selected for analysis and reporting.

Any suitable output may be generated. For example, an alert or alarm may be set to identify and call attention to devices associated with anomalous data. Identification information for such devices may be added to a client report by client reporting module 212. The client report may be provided to a customer responsible for the devices for further action to prevent subsequent anomalies by the devices. Further action may include any suitable action, such as disabling a suspect device, disabling the SIM of the suspect device, cancelling the account associated with the suspect device on the mobility network or disabling the transceiver of the device so that the device is no longer able to access the network. The customer may provide a remote software update to the device to correct a discovered problem. The customer may initiate a recall of some or all affected devices. The customer or other party may contact the vehicle owner associated with the suspected device to determine the nature of the anomalous data, such as device malfunction, presence of malware, fraud, or other cause.

In general, information determined for individual devices or vehicles is aggregated or processed together to reveal trends or large-scale results that may not be visible from data for a single device. The client report may include tables, graphs or other data presentations showing information about selected vehicles, such as a particular make or model of a vehicle.

In one embodiment, the output includes information about vehicles in a fleet of vehicles manufactured by or managed by a customer of the mobility network operator. Such information may be presented in any convenient format, such as graphically. Such information may include, for example, historical and daily average session durations for vehicles in the fleet, in minutes, for example, The information may be presented as a list, organized for example by IMEI. Further, such information may include corresponding standard deviation information, in minutes. Such information may further include an average number of sessions per UE per day. This may be presented, for example, as a bar chart and a table of historical values. Such information may further include the number of sessions terminating abnormally as well as a breakdown of abnormally terminated sessions by cause for termination (CFT) code.

Further any suitable type of session anomalies may be tracked, analyzed and presented. In a first example, a session anomaly is identified when the average session duration for the fleet of devices on a given day varies from the historical mean by an amount greater than threshold, for example, with a default set to 3*Standard Deviation ("SD"). In a second example, a session anomaly is identified when the average duration of session for a device on a given day varies from historical mean of session duration for the fleet by an amount that is greater than threshold, with a default set to 5*SD. In a third example, a session anomaly is identified when the number of sessions opened by a device in a given day exceeds the historical daily average of sessions per device by an amount that exceeds the threshold, where any suitable threshold may be defined. In a fourth example, a session anomaly is identified when the portion of large sessions (for example, defined by a CFT value of 16, corresponding to data transfer of larger than 20 MB) exceeds historical average for a fleet in more than threshold, with a default set at 5*SD. In a fifth example, a session anomaly is identified when the portion of long sessions (e.g., CFT=17 corresponding to a session longer than 1 hour) exceeds historical average for a fleet in more than threshold, with a default set at 5*SD.

Figure 2B:
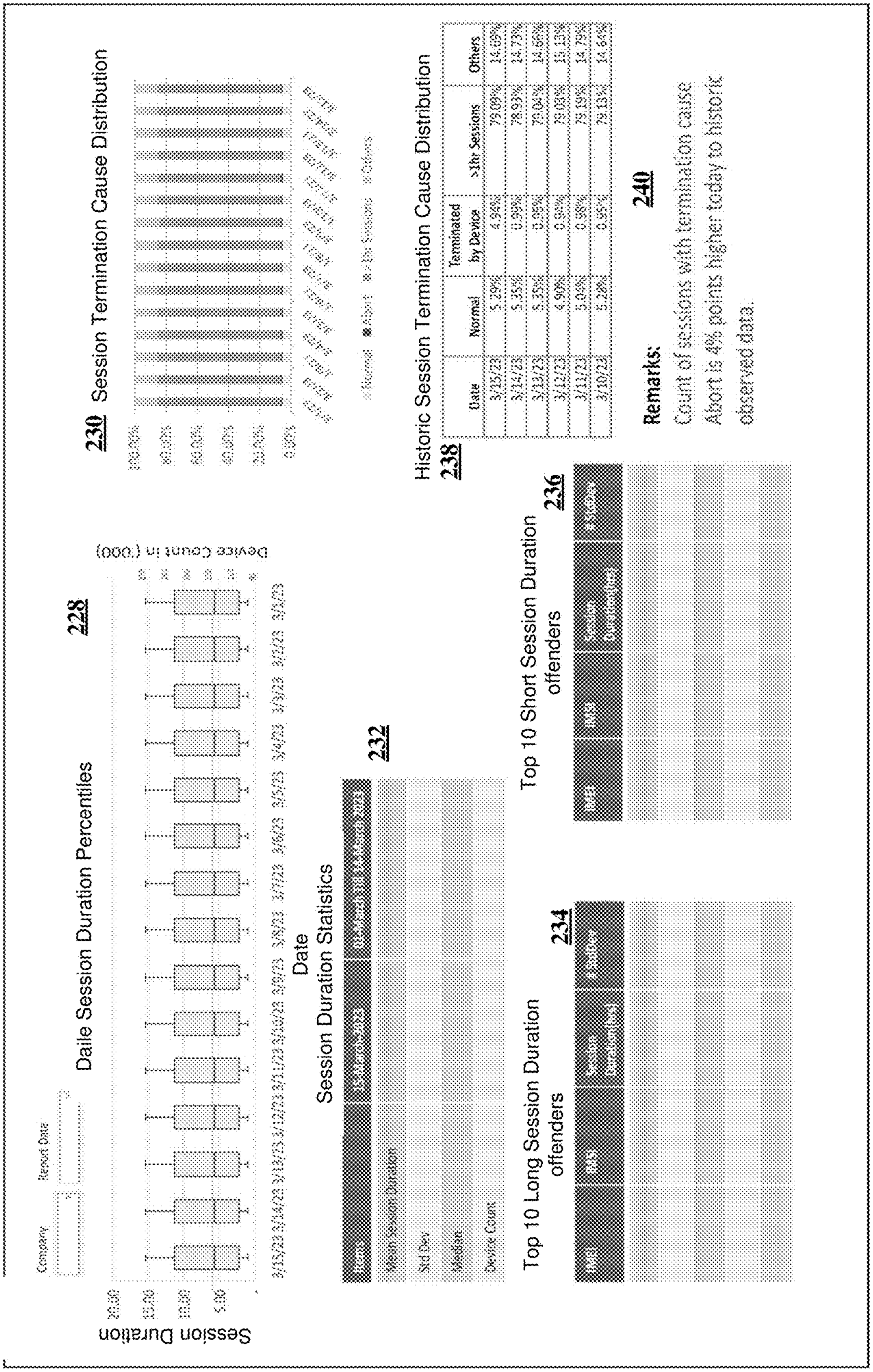
FIG. 2B is an exemplary, non-limiting embodiment of a user display and report for informing users about an anomaly detection process performed by the system of FIG. 2A.

FIG. 2B is an exemplary, non-limiting embodiment of a user display 226 and report for informing users about an anomaly detection process performed by the system 200 of FIG. 2A. The user display 226 may be generated by, for example, the session anomaly score module 210 or other reporting module configured for generating alerts and reports based on the detected session anomalies. Details of the user display 226 may be selected by the reporting module, the customer or other recipient of reports including the user display or others. In the example, the user display 226 includes a session duration graph 228, a session termination cause duration graph 230, and tabular information including a session duration statistics table 232, long session duration offender identification table 234, short session duration offender identification table 236, and historic session termination cause distribution table 238. The user display 226 also includes a remarks section for provision of narrative information. Not all data is presented in the exemplary embodiment of FIG. 2B. Any other suitable presentation of data may be made available to a user such as a customer or manufacturer associated with a device such as a connected car or an IoT device.

Figure 2C:
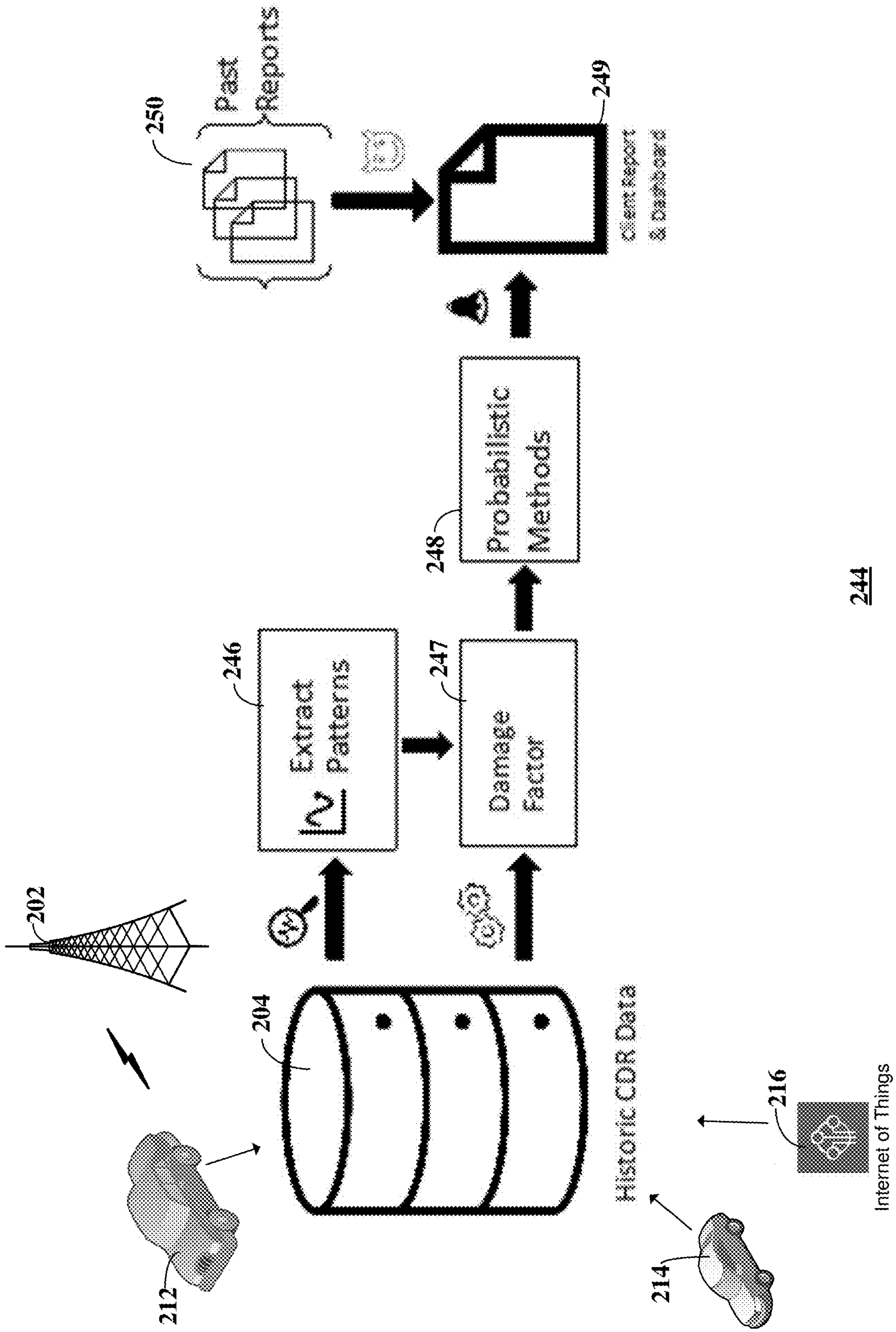
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of a system 244 functioning within the communication network of FIG. 1 in accordance with various aspects described herein. The system 244 may be used for anomaly detection in a mobile communication network such as the wireless access 120 of FIG. 1. In the system 244, devices such as devices associated with connected vehicles like vehicle 214 and vehicle 216, as well as IoT device 218, communicate with a data network such as mobility network 202. Data associated with such communication is collected, processed and stored as call detail records in CDR repository 204.

The system 244 may be used for detecting volumetric anomalies per User Equipment (UE) for IoT devices such as IoT device 218 and connected cars such as vehicle 214 and vehicle 216. Volumetric anomalies occur when the volume or amount of data being communicated with a UE device changes, either suddenly or over a time period. The network operator has access to information about data transfers over the mobility network to and from the UE device. The network operator cannot determine the content because the information is generally encrypted. However, the volume of data, in terms of for example Mbytes or Gbytes, may be determined to form an indicator of volume of traffic to and from a device. Moreover, the frequency of data transfers may be determined as well to form an indicator of volume of traffic to and from the device.

In an example, a connected vehicle of a particular model and manufacturer generally uploads or downloads approximately 2.5 Mb per day. This may represent normal operation for the connected vehicle. In a change, on a particular day, a group of cars of the same model or manufacturer uploads or downloads 10 Gb in the day. The large, sudden increase in data transfer is anomalous and may justify an alert from the network operator to the customer or provoke investigation. Moreover, the large, sudden increase in data may have security implications, particularly for the vehicle manufacturer. For example, a fraudulent party may have installed malware on the vehicles showing the sudden increase in data transfer or may be using the vehicles to launch a distributed denial of service (DDOS) attack or other network action on a third party. Similarly, large downloads to one or some devices may indicate that a fraudulent party is installing malware or other unpermitted code or data. Such anomalies should be reported to the customer or other interested party and further investigation undertaken, along with corrective action if appropriate.

In the exemplary embodiment, the system 244 includes a pattern extraction module 246, a damage factor module 247, a probabilistic methods module 248 and a client reporting module 249. The client reporting module 249 may have access to or rely on past reports 250. Other embodiments will include additional or alternative features, and functions may be grouped separately.

The pattern extraction module 246 operates to collect and preprocess time-series data from IoT devices and connected vehicles. The time series data may be stored as call detail record data in the CDR repository 204. Any suitable data from individual call detail records may be retrieved by the pattern extraction module 246. In particular, call detail records include an indication of an amount of data communicated on an uplink or a downlink with a device associated with a SIM during a session.

The pattern extraction module 246 operates on one UE at a time to identify patterns of relatively high-volume communication or unexplained high volume data transfer. The volume of data communicated or transferred or used may be considered relatively high based on any suitable criterion, such as in comparison to a mean value or exceeding a mean value by a specified number of standard deviations. The pattern extraction module 246 may be directed to evaluate data usage for any subset of connected vehicles and IoT devices with data stored in the CDR repository 204. For example, a report may be requested by a customer or prepared for a customer to analyze all connected vehicles of the customer, or all connected vehicles of a specified model or model year. The vehicles of interest may be specified in any suitable manner such as a unique vehicle identification number (VIN). The pattern extraction module 246 operates to analyze the time-series data for multiple features of sessions, such as type of events, distribution of events, and the volume of uplink and downlink data. Data is processed for a particular UE associated with a SIM, such as a particular connected vehicle or IoT device. When the data for the particular UE is processed, the pattern extraction module 246 selects another UE to evaluate and continues until all specified vehicles have been processed.

Volumetric anomalies may be detected, for example in some embodiments, by analyzing time-series data, applying appropriate analytics including machine learning algorithms and artificial intelligence techniques, and developing adaptive models to mimic normal behavior and identify anomalous behavior.

When the data is processed, a pattern of data communication for the particular UE is identified. The pattern may show data communication (uplink, downlink) over time. Any other suitable way of presenting or analyzing the device data may be used. The pattern may be used to identify high-volume activity by the UE. For example, any suitable standard such as a threshold specified in Mb or Gb, or a number of bytes per session or per second or per hour, may be used. The thresholds may be adjusted based on any suitable factor including empirical experience with the vehicle's history or history of multiple vehicles.

A large or sudden change in volume of data is not necessarily indicative of improper activity. In the case of APN anomalies, there are a limited number of APNs in the mobility network and identifying anomalies is straightforward. However, in the case of volumetric analysis, the volume of data consumed by a UE device such as a connected vehicle or IoT device can change for many reasons. The changes can include large-scale increases or spikes in data communication. For example, it has been observed that in a particular time frame, a specific fleet or group of vehicles experienced a large spike in data downloads. The data downloads, however, were actually due to a software update to the vehicles, not to inappropriate activity. Other spikes in activity can be due to environmental factors such as traffic and weather. Thus, the mere identification of a change in usage cannot be ascribed as anomalous.

To account for such routine variations in usage, the damage factor module 247 provides an indication of criticality or potential severity of a detected increase (or decrease) in data usage or communication to the UE device. Further, the damage factor module 247 determines a metric based on historical usage and fleet-wide usage. Any suitable parameters may be used to determine the damage factor metric. For example, the damage factor module 247 may consider, for a particular vehicle, the total data usage of that vehicle over time. In another example, the damage factor module may consider data usage of all vehicles associated with a particular vehicle manufacturer. Moreover, usage data for a particular vehicle during a particular time window may be compared to usage by other similar vehicles during the same time window, such as vehicles of the same model or vehicles of the same manufacturer. For example, all vehicles of the same model and model year may receive a software update during the same overnight period, or over the course of a week. Comparing data usage or communication for a particular vehicle with data communication for similar vehicles may provide an explanation for a usage spike or reduce the likelihood that the usage spike is to be treated as an anomaly requiring investigation.

In another aspect, the damage factor module 247 may identify what may be determined chronic offenders, or UE devices that over a time period that may be specified, exhibit a relatively large (or small) usage of data. For example, a connected vehicle may use what is considered a normal amount of data, relative to other similar vehicles, throughout a week period, but one day per week, usage for that vehicle spikes, relative to other vehicles. The usage spike may be an increase in downloaded data on a downlink, or an increase in uploaded data on an uplink, for example, or a combination of the two. Such chronic offenders may be reported by the network operator to the customer for further analysis and may represent a potential volumetric anomaly. The chronic offender may get further scrutiny, to understand the reason for the exhibited behavior. Or the chronic offender may be dismissed as not significant or not as important as a UE device that experiences a sudden, singular surge in usage.

Thus, the damage factor module 247 determines and provides an indication of criticality or potential severity of a detected increase (or decrease) in data usage or communication to the UE device. The indication provided by the damage factor module 247 may be termed a damage factor. The damage factor module 247 may indicate that an unusual data consumption for a vehicle is routine or uninteresting, or merits reporting and further investigation. The damage factor may be used to justify or prompt further investigation by the network operator or manufacturer, or the damage factor may be used to dismiss further investigation. Further, if a group of devices exhibits a similar usage pattern, or routinely shows up on a list of chronic offenders, the devices of the group may warrant further investigation. The damage factor for each vehicle or group of vehicles may be determined and ranked and used for reporting. For example, one hundred users may be identified as potential anomalies, but only the top 5 chronic offenders may be selected for reporting, based on the damage factor for those UE devices. Calculation of the damage factor enables identification and reporting of such usage by individual UE devices.

The probabilistic methods module 248 compares a current usage, for a current time period for a selected vehicle or UE device, with historical usage data. For example, each vehicle or UE device may have one or more usage thresholds based on the past week's usage by that vehicle or similar vehicles. The data usage or consumption by the vehicle for the current day may be compared with the threshold or thresholds and used to identify a volumetric anomaly. Thus, in embodiments, the probabilistic method module 248 is used to identify volumetric anomalies. The damage factor module 247 is used to rank the anomalies.

Information from the probabilistic methods module 248 may be used to format and populate a report or dashboard by the client reporting module 249. The client report or dashboard is presented for use by customers or others associated with analyzing and rectifying data anomalies by UE devices such as connected vehicles or IoT devices. In example, embodiments, the dashboard or client reports provide context for any detected anomalies. In isolation, a single volumetric anomaly by a single vehicle is interesting but not informative. The dashboard allows comparison of that single anomaly over time, over different vehicles, and across other factors as well. Toward that end, the client reporting module 249 may have access to or rely on past reports 250. The past reports 250 may be used to identify trends in the data and report such trends, or make the trends visible to a human user, and thereby provide insight.

FIG. 2D is an exemplary, non-limiting embodiment of a user display 252 and report for informing users about an anomaly detection process performed by the system of FIG. 2C. The user display 252 may include any suitable combination of graphics, text and charts to display useful information to a user. In the example of FIG. 2D, the user display 252 includes an hourly volume chart 253 plotting count of vehicle anomalies against time, a total volume transfer pie chart 254 showing access point names by share of anomalies detected. User display 252 further includes a percentage consumption chart 255 showing download count and percentage versus total download volume. The user display 252 further includes tables showing worst case offenders, including a table 256 of upload offenders, a table 257 of download offenders, a table 258 of upload and download offenders combined, and a table 259 of top 10 chronic offenders. The hourly volume chart 253 indicates a usage spike 253*a*. Each of the tables includes columns labeled IMEI, identifying a particular vehicle or SIM, upload or download volume in Mbytes, and a damage factor calculated by the damage factor module 247. The table 259 of top 10 chronic offenders further includes a column showing a number of days the UE device, identified by IMEI, appeared in the top 10 list. Any other data or information or presentation may be made available. Moreover, in some embodiments, the user display 252 may be made interactive so that a user can access a mouse, keyboard or other input device to select information to be displayed and modify the display.

Reports such as the user display 252 may help the customer or other user identify potential issues to investigate further. Investigation may include steps to identify fraud or abuse of a UE device in a connected vehicle or IoT device and to prevent further such fraud or abuse. Preventative steps may include disabling the SIM associated with UE device, blocking network access by the SIM, modifying or updating the software of the UE device and recalling the vehicle associated with the device for a physical inspection and modification of the UE device. Such actions may be prompted by identifying, classifying and ranking volumetric anomalies occurring in the communications system including the mobility network 202.

Figure 2E:
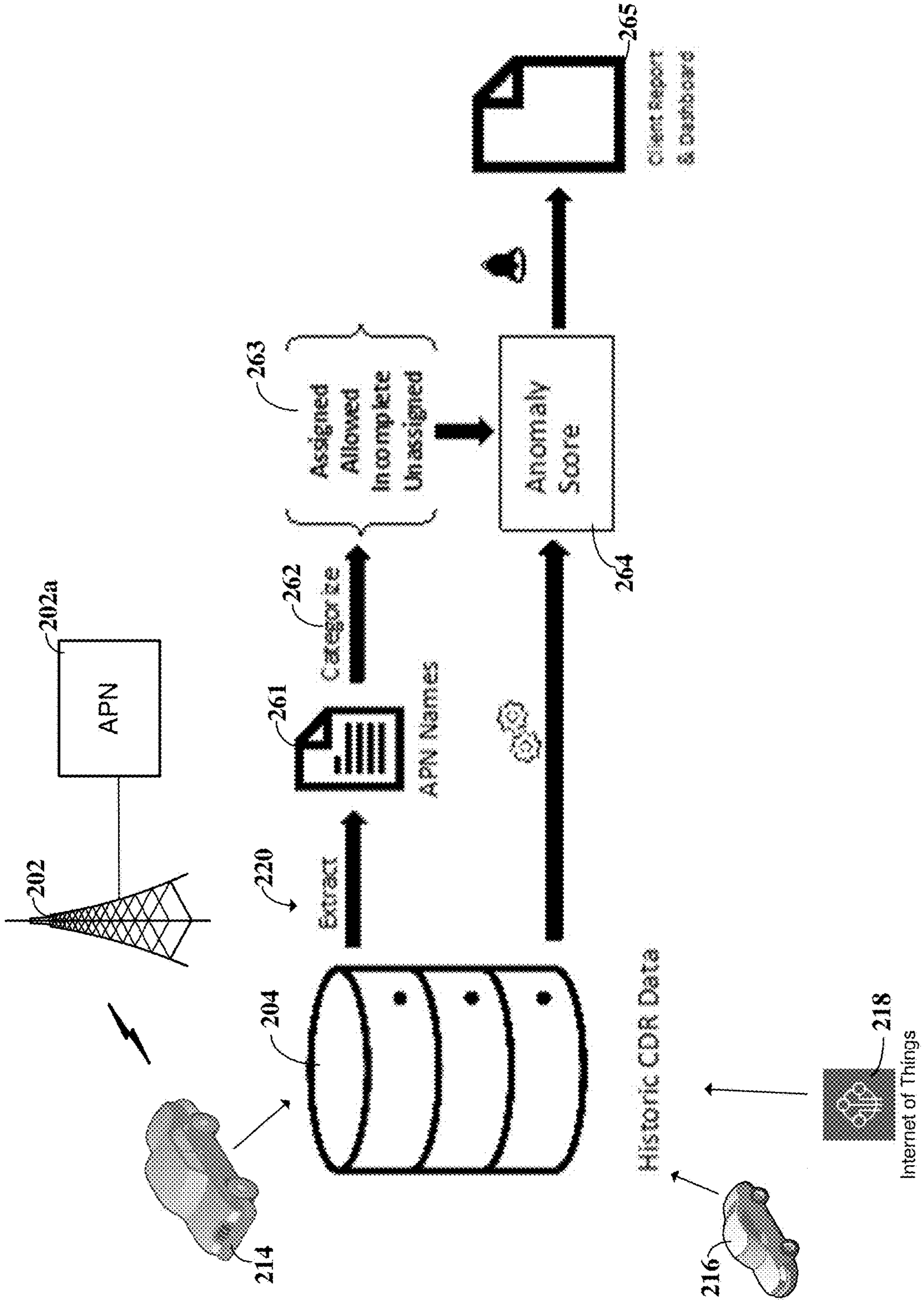
FIG. 2E is a block diagram illustrating an example, non-limiting embodiment of a system functioning within the communication network of FIG. 1 in accordance with various aspects described herein.

FIG. 2E is a block diagram illustrating an example, non-limiting embodiment of a system 260 functioning within the communication network of FIG. 1 in accordance with various aspects described herein. The system 260 may be used for anomaly detection in a mobile communication network such as the wireless access 120 of FIG. 1. The system 260 may be particularly useful for detecting anomalies that occur when a UE device such as a connected vehicle or IoT device attempts to contact an access point name (APN) in the mobility network other than an APN to which the UE device is assigned or associated. In the system 260, UE devices such as devices associated with connected vehicles like vehicle 214 and vehicle 216, as well as IoT device 218, communicate with a data network such as mobility network 202. Data associated with such communication is collected, processed and stored as call detail records in CDR repository 204. The system 260 includes a database of APN names 261, a categorizing module 262, a categorizing result list 263, an anomaly score module 264 and a client reporting module 265. The embodiment of FIG. 2E is intended to be exemplary only.

The system 260 may be used for detecting mismatched APNs in IoT and connected cars by generating an exhaustive list of APN names, proposing a probabilistic model for APN mismatch detection based on APN name categorization coupled with association rules. An access point name (APN) is an identifier for a gateway between a mobility network and another computer network, such as the public internet. A UE device operative on the mobility network 202 is provided by the network operator with the APN in order to access the network. When the UE devices attempts to communicate with the mobility network the UE device must provide its assigned APN in order to successfully communicate. In an example, am APN is used to identify a correct IP address that the UE device should be identified with on the mobility network, determine if a private network is needed by the APN, choose the correct security settings that should be used, and other factors. A private network may correspond to a network of a customer of the mobility network operator whose devices access the mobility network.

In example embodiments, the mobility network includes one or more APNs associated with access points such as access point 202*a*. One or more access points, including access point 202*a*, may be assigned to or associated with a customer of the mobility network 202. For example, a manufacturer of connected vehicles may have a single access point for all connected vehicles manufactured by the manufacturer. In another example, the manufacturer may have several assigned access points, including a first access point for a first vehicle model, a second access point for a second vehicle model, etc. When a UE device of a connected vehicle or IoT device contacts the mobility network, the APN is used to route the traffic to the correct access point and then to the network of the manufacturer. Further, the APNs associated with the manufacturer may have a designated purpose, such as connectivity for information and entertainment services (referred to as infotainment), or connectivity for informatics services.

In general, two types of APN anomalies occur in the mobility network 202. In a first type of APN anomaly, a UE device such as a connected vehicle having an assigned APN associated with a particular manufacture attempts to contact a third-party APN or an APN assigned to someone other than the particular manufacturer. In an example, such a communication attempt may be due to a fraudulent attempt to contact a website of the third party and download malware or other improper information from the third party. This may be considered anomalous and may be flagged. In a second type of APN anomaly, a UE device such as a connected vehicle associated with a first manufacturer tries to contact an APN of a second manufacturer to which the vehicle is not assigned. This also should not be allowed by the mobility network. This may also be considered anomalous and be flagged.

In the system 260, the extraction process 220 accesses the CDR repository 204 and extracts information about each connection made by each device, per day, from the CDR repository. In the example, each UE device is processed separately until all UE devices of interest are processed. The time period of one day is used in this example but any suitable time window could be used. For each connection between the UE device such as the vehicle 214 and the mobility network 202, the APN for the connection as stored in the CDR 204 is compared with a list of all APN names in the database of APN names 261, In some implementations, while there are only a few possible APNs for the manufacturer or customer of the mobility network, it is noted that some UE devices are actually connected to a very large number of APN, possible dozens or more. Accordingly, in some embodiments, a categorizing module 262 analyzes the APN of the call detail record for a particular connection and determines the nature of the APN data of the call detail record. If the APN of a CDR for a connection matches an assigned APN of the manufacturer, the APN is categorized as "Assigned." If the APN of the CDR matches an APN of the manufacturer for which access is allowed by the manufacturer, the APN is classified as "Allowed." If the data of the APN retrieved from the CDR repository 204 is unrecognizable or incomplete, the APN is categorized as "Incomplete." IF the APN for the CDR is not assigned to the manufacturer, the APN is categorized as "Unassigned."

In an example, a CDR for a data session by a particular connected vehicle 214 retrieved from the CDR repository includes an IMEI associated with the SIM of the connected vehicle 214 as well as the APN used by the connected vehicle 214 when making that connection for that data session with the mobility network. The IMEI includes identification information for the SIM and connected vehicle 214 and may be used to determine to what APNs the connected vehicle 214 may connect. This may include APNs to which the SIM card and connected vehicle 214 are assigned and APNs to which the SIM card and connected vehicle 214 are allowed to connect. If the actual APN used does not match one of the assigned APNs or allowed APNs for this IMEI, the connection by connected vehicle 214 may be categorized as incomplete or unassigned.

The anomaly score module 264 receives categorized information from the categorizing module 262 and identifies APN anomalies. As noted, a first type of APN anomaly corresponds to a UE device having an assigned APN that attempts to contact an unassigned APN, such as an APN associated with a third party. A second type of APN anomaly corresponds to a UE device trying to contact an APN of a second manufacturer to which the vehicle is not assigned. The anomaly score module 264 processes the data for all UE devices individually and provides the data to the client reporting module 265.

The client reporting module 265 formats and populates a report or dashboard for use by the customer such as a connected vehicle manufacturer. The client report or dashboard is presented for use by customers or others associated with analyzing and rectifying data anomalies by UE devices such as connected vehicles or IoT devices. The report of APN anomalies provides context and insight into possible fraudulent or inappropriate activity on the mobility network.

Figure 2F:
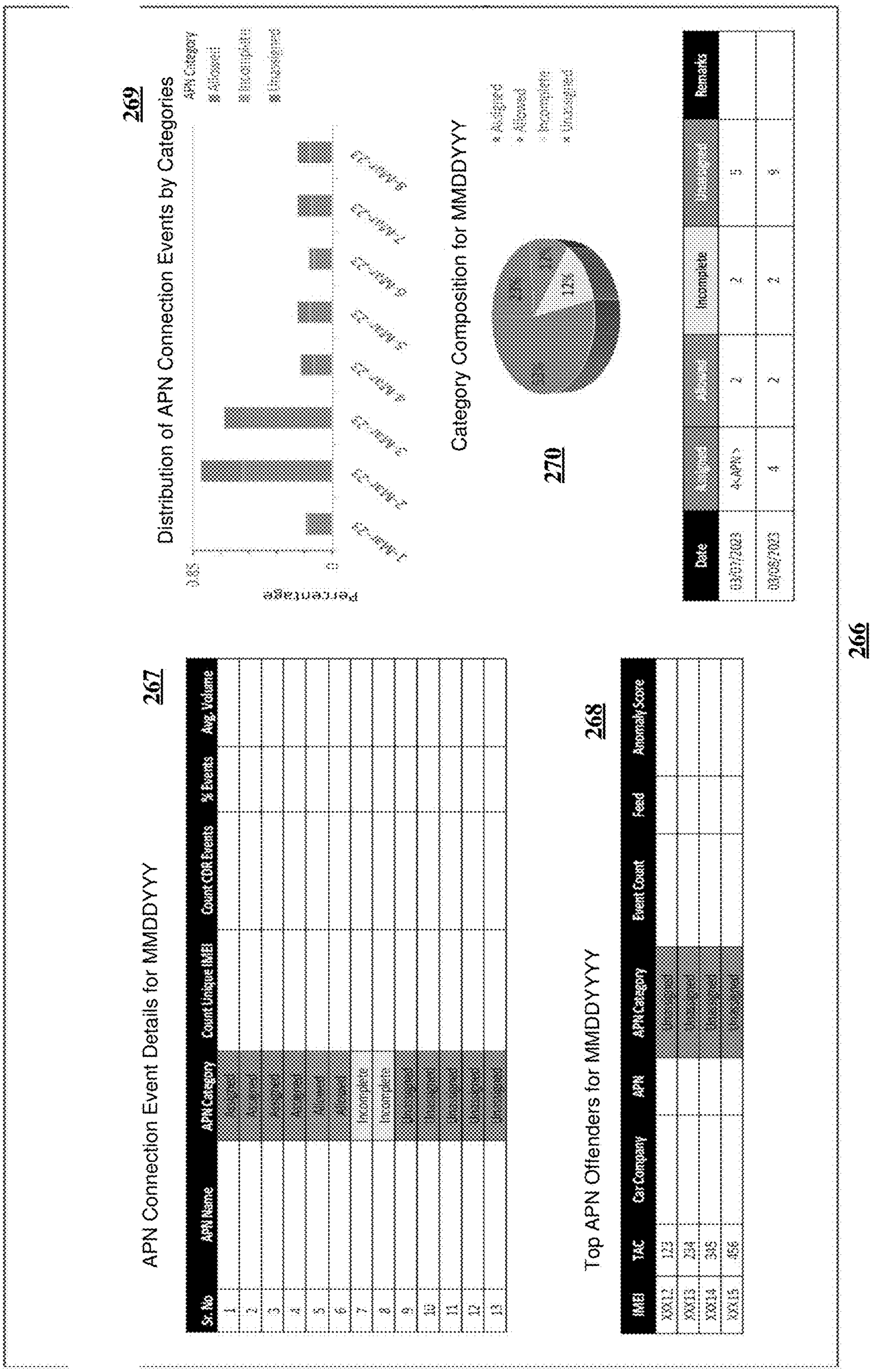
FIG. 2F is an exemplary, non-limiting embodiment of a user display and report for informing users about an anomaly detection process performed by the system of FIG. 2E.

FIG. 2F is an exemplary, non-limiting embodiment of a user display 266 and report for informing users about an anomaly detection process performed by the system of FIG. 2E. Any suitable information, in any suitable format, may be provided for presenting information about APN anomalies in the mobility network 202. In the exemplary embodiment of FIG. 2F, the user display 266 includes a table 267 including APN connection event details for a day of interest, a table 268 including a list of top 10 APN offenders for the day of interest, a bar chart 269 showing a distribution of APN connection events by category, a pie chart 270 showing category composition of APN anomalies for the day of interest, and a table showing historic composition of categories for APN anomalies period. Information displayed in the tables and charts generally includes an APN name, an APN category, and a count value. Other information may be charted and presented as appropriate. In some embodiments, the user display 266 may be interactive to allow a user such as a customer to select information for display and modify the manner in which the information is displayed.

Reports such as the user display 266 may help the customer or other user identify potential issues to investigate further. Investigation may include steps to identify fraud or abuse of a UE device in a connected vehicle or IoT device and to prevent further such fraud or abuse. Preventative steps may include disabling the SIM associated with UE device, blocking network access by the SIM, modifying or updating the software of the UE device and recalling the vehicle associated with the device for a physical inspection and modification of the UE device. Such actions may be prompted by identifying, classifying and ranking volumetric anomalies occurring in the communications system including the mobility network 202.

Figure 2G:
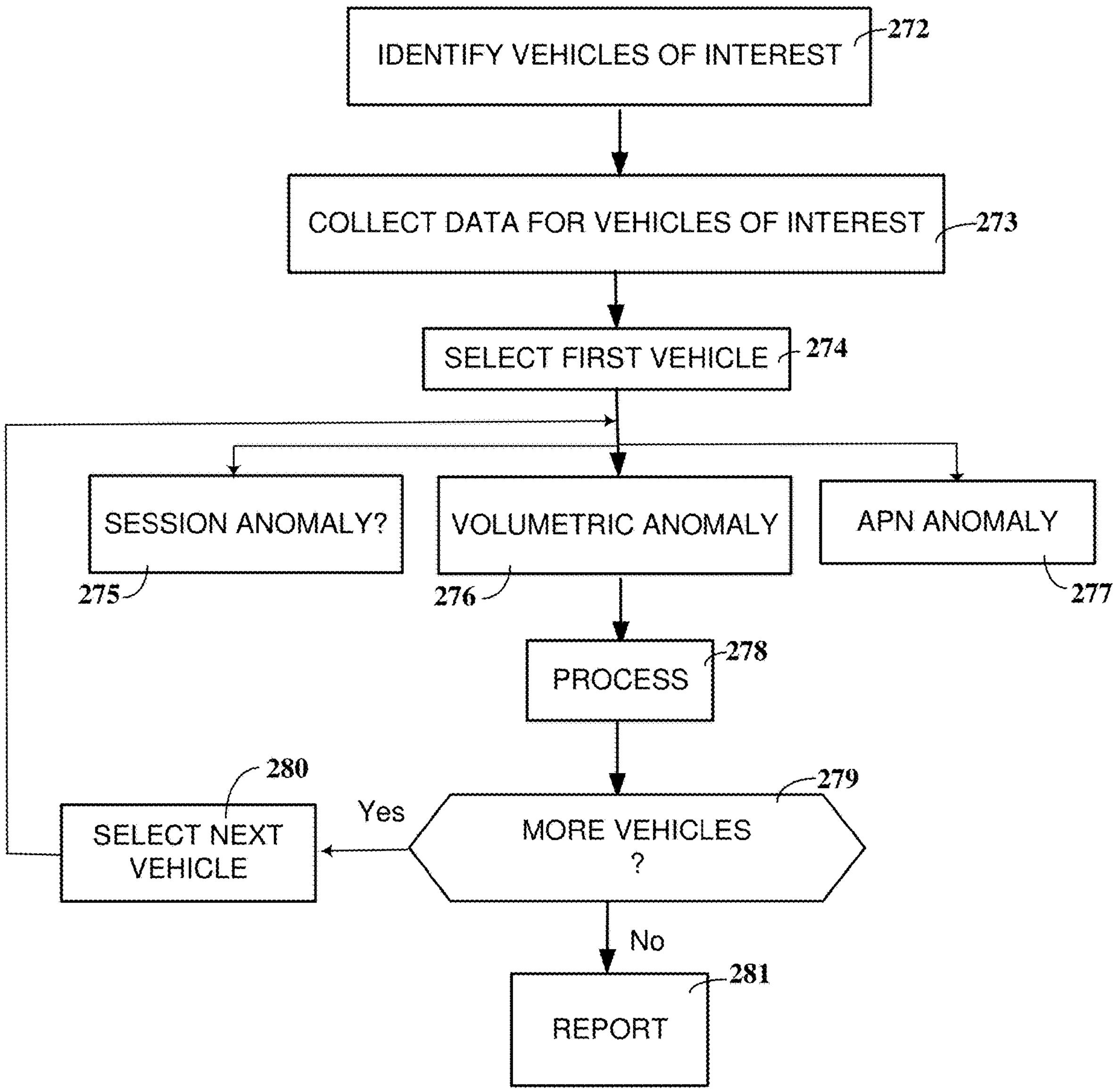
FIG. 2G depicts an illustrative embodiment of a method in accordance with various aspects described herein.

FIG. 2G depicts an illustrative embodiment of a method 271 in accordance with various aspects described herein. The method 271 may be performed in conjunction with any suitable processing system including one or more processors and memory and memory storing data and instructions. The method 271 may be performed in exemplary embodiments by systems and personnel of a mobile network operator or other network provider. The method 271 may be used to identify anomalous activity in a data network such as a mobility network and to identify potential hackers and fraudulent activities and stop the harm that can be caused to personnel or infrastructure using anomalies as detected in session attributes. The method 271 is described in connection with connected vehicles. However, the method 271 may readily be extended to networks of IoT devices.

At step 272, a set of vehicles of interest is identified. For example, a user may be interested in analyzing potential anomalies by all vehicles of a fleet of vehicles manufactured by a particular manufacturer, certain models of all vehicles, certain model years of vehicles or models, etc. The scope of the vehicles of interest is identified in order to specify the data which should be collected for further analysis.

At step 273, data from the vehicles of interest is collected for further processing. In the exemplary embodiment, call detail records associated with mobility network accesses by the vehicles of interest is collected. Such call detail records are routinely collected and stored by a mobility network operator. The data may be identified as associated with the vehicles of interest and collected or selected for further processing. Useful data may be retrieved from any other source, including for example historical usage data, account or device provisioning information, and other information available to the network operator.

At step 274, a first vehicle is selected for processing. The vehicle is selected from among the group of vehicles of interest identified in step 272. In particular, the vehicle may be identified by any suitable information such as its IMEI or other network identifier. The IMEI or other identifier is used to retrieve or select the data associated with the first vehicle for further processing, such as by collecting all call detail record data associated with the IMEI of the vehicle.

At step 275, it is determined if a session anomaly exists for the vehicle. In an embodiment, the procedure and devices illustrated in conjunction with FIG. 2A may be used to perform step 275. Similarly, at step 276, it is determined if a volumetric anomaly exists for the vehicle. In an embodiment, the procedure and devices illustrated in conjunction with FIG. 2C may be used to perform step 276. Still further, at step 277, it is determined if an APN anomaly exists for the vehicle. In an embodiment, the procedure and devices illustrated in conjunction with FIG. 2E may be used to perform step 277. In the example embodiment of FIG. 2G, step 275, step 276, and step 277 are illustrated as being done substantially at the same time. In other embodiments, the steps may be done in a different order, in series, or in any suitable combination.

At step 278, data collected and anomalies identified are processed. Such processing may include preparation of data for display and reporting, storage of data, accumulation of historical data, and other procedures. At step 279, it is determined if there are more vehicles to process among the group of vehicles of interest. If so, control proceeds to step 280, and a next vehicle in the group of vehicles of interest is selected. Control then returns to step 275, step 276 and step 277 for further analysis and identification of anomalies associated with the next vehicle.

If, at step 279, there were no more vehicles to process, all vehicles of the group of vehicles of interest have been processed. Control proceeds to step 281, and a report is generated. The report may include, for example, a dashboard including textual, graphical and tabular features, such as the examples of FIG. 2B, FIG. 2D, and FIG. 2F.

Accordingly, systems in accordance with various aspects described herein, including the system 200 of FIG. 2A, system 244 of FIG. 2C, and system 260 of FIG. 2E, enable discovery, analysis, reporting and rectification of data anomalies or usage anomalies in a mobility network accessed by very large number of devices such as IoT devices and connected vehicles. In real-world examples, there may be 50 million or 70 million or more devices active and potentially generating inappropriate activity. Such inappropriate activity may relate to fraud and may affect security of the devices themselves, systems which use or rely on the devices, and the mobility network itself. Heretofore, there has been no way to identify such anomalies or even know what such anomalies may look like, or even know what a normal day of network data looks like. Customers have assumed the problem was nonexistent or negligible. The disclosed system and method provided a more reliable understanding of network activity and methods for responding to inappropriate activity.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
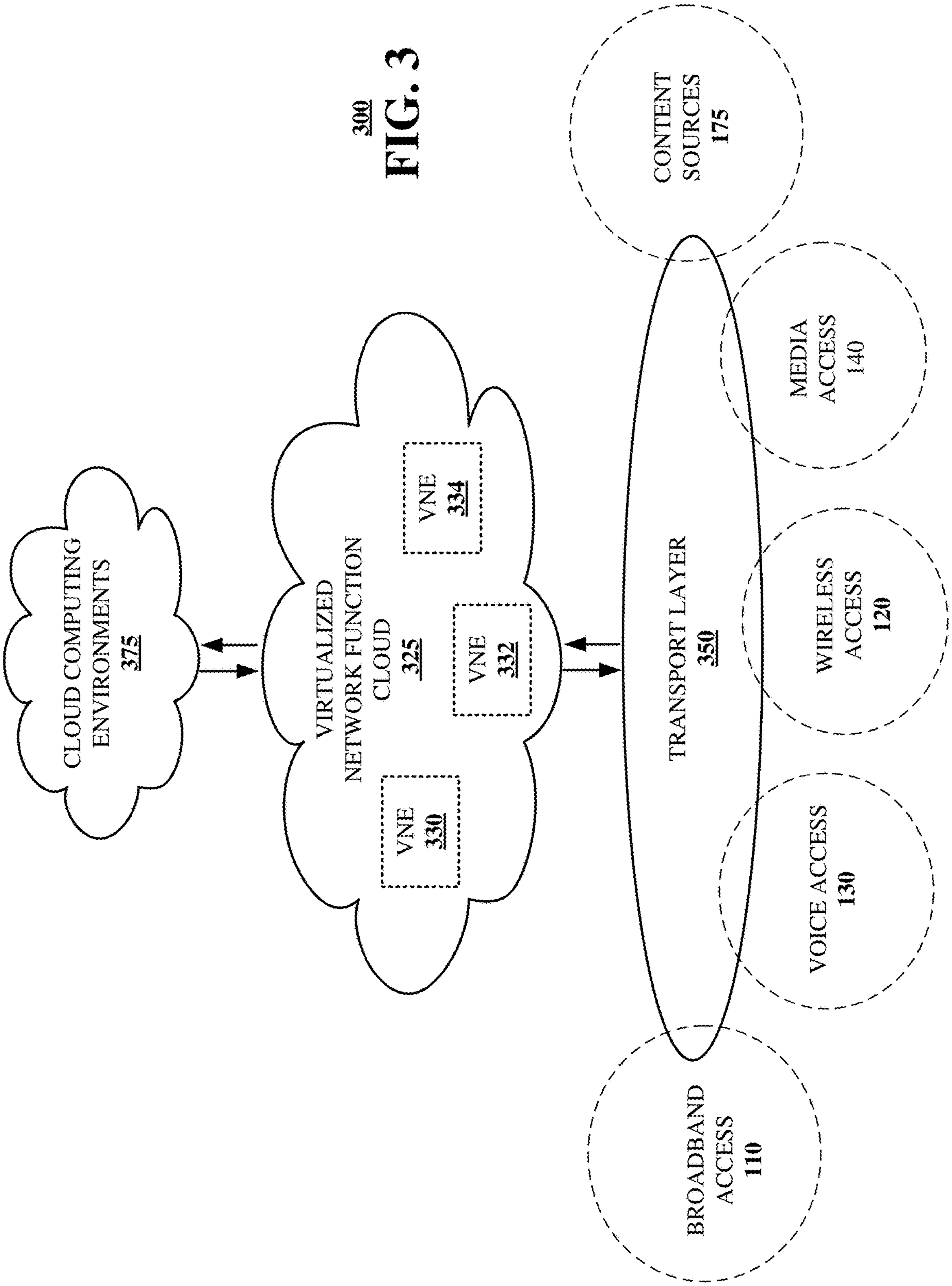
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network in accordance with various aspects described herein. In particular a virtualized communication network 300 is presented that can be used to implement some or all of the subsystems and functions of system 100, the subsystems and functions of system 200, system 244, system 260 and method 271 presented in FIG. 1, FIG. 2A, FIG. 2C, FIG. 2E, FIG. 2G and FIG. 3. For example, virtualized communication network 300 can facilitate in whole or in part to access and process communication session data from a wireless or mobility network to identify anomalous behavior that may correspond to inappropriate activity on the network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
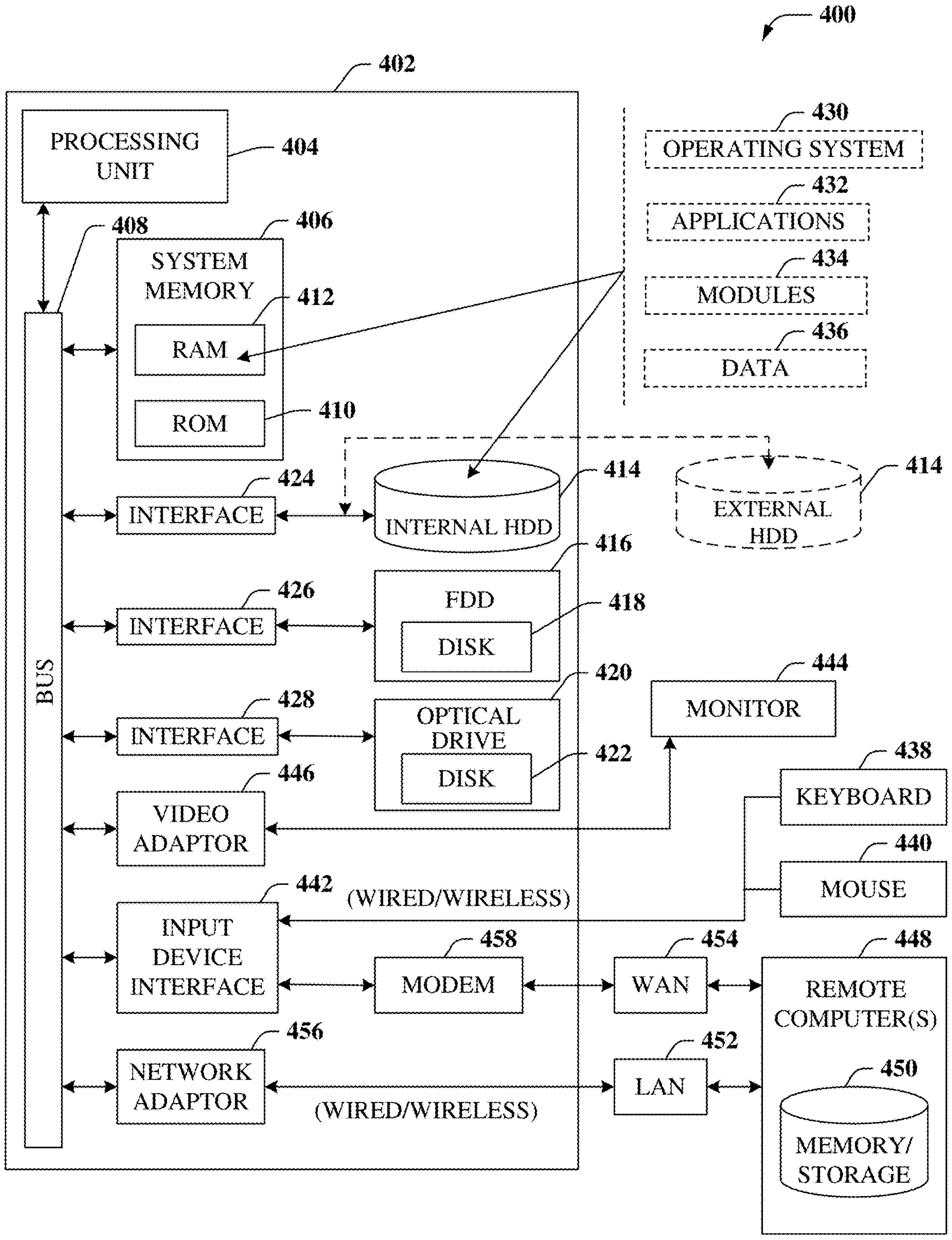
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part processing call detail record data and other communication session data associated with mobility network communications to identify anomalous behavior in a network that may correspond to inappropriate activities in the network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
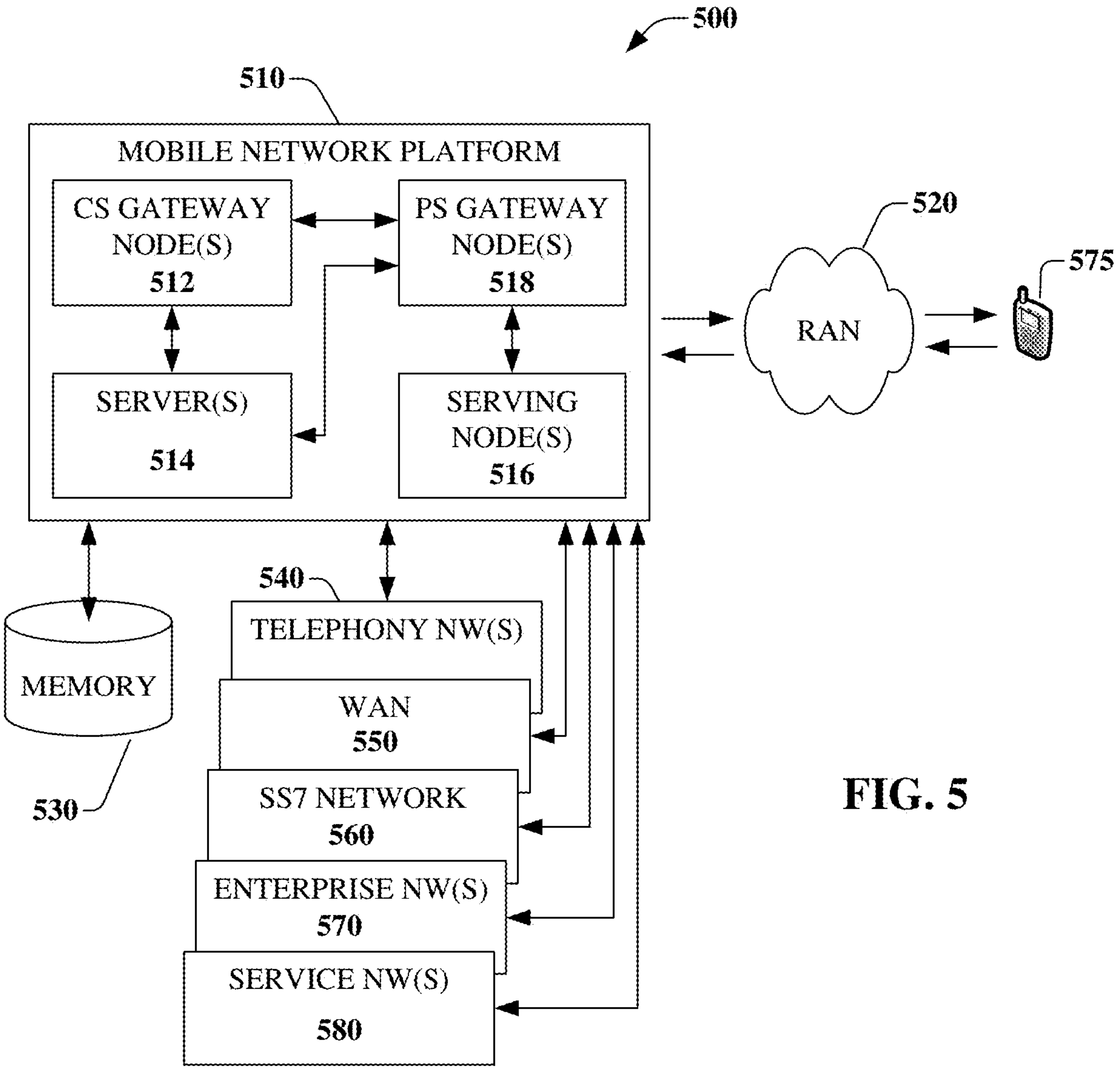
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting and storing communication session data such as call detail records for sessions involving a mobility network including the mobile network platform 510 and mobile devices in order to identify communication anomalies that may correspond to fraudulent or other inappropriate activity in the mobility network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
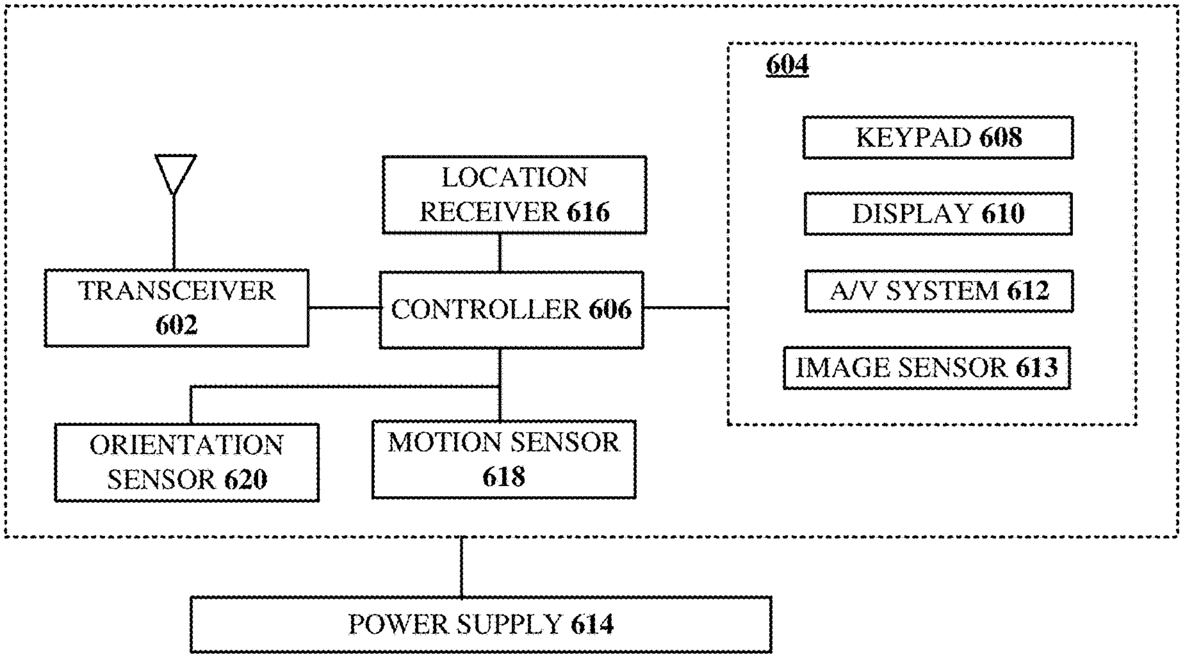
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part collecting and processing session data for communication data involving communications between a communication device such as the communication device 600 and a mobility network. The session data can be processed to identify anomalies that may signal fraudulent or other inappropriate activities in the network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

retrieving call detail record (CDR) data for a plurality of devices, each device of the plurality of devices using a subscriber identity module (SIM) to access a mobility network;

identifying data anomalies for the plurality of devices, wherein the identifying the data anomalies comprises identifying an access point name (APN) anomaly based on the CDR data, wherein the data anomalies may be indicative of inappropriate usage of the mobility network;

identifying a device associated with a data anomaly; and initiating a modification of the device to prevent subsequent anomalies.

2. The device of claim 1, wherein the identifying data anomalies for the plurality of devices comprises:

identifying a session anomaly based on the CDR data.

3. The device of claim 2, wherein the identifying a session anomaly comprises:

retrieving historical session statistics for the plurality of devices;

comparing session statistics for the plurality of devices for a current time period with the historical session statistics; and identifying the session anomaly based on the comparing.

4. The device of claim 3, wherein the operations further comprise:

comparing an average session duration for the device for the current time period with a historical mean of session duration for the plurality of devices.

5. The device of claim 1, wherein the identifying data anomalies for the plurality of devices comprises:

identifying a volumetric anomaly based on the CDR data.

6. The device of claim 5, wherein the identifying a volumetric anomaly comprises:

identifying patterns of relatively high data usage for a selected device based on the CDR data;

identifying similar devices among the plurality of devices;

comparing the patterns of relatively high data usage by the similar devices with the patterns of relatively high data usage for the selected device; and identifying the volumetric anomaly based on the comparing.

7. The device of claim 5, wherein the operations further comprise:

identifying one or more devices that, over a time period, use a relatively large amount of data, wherein the identifying is based on the CDR data; and reporting the one or more devices for further investigation of a potential volumetric anomaly.

8. The device of claim 1, wherein the identifying the APN anomaly comprises one or more of:

identifying that an APN is incomplete;

identifying that the APN is unrecognizable;

identifying that the APN is not assigned to a manufacturer of the device; or a combination thereof.

9. The device of claim 1, wherein the identifying the APN anomaly comprises:

identifying a set of allowed access point names (APNs) for connection by devices of the plurality of devices; and identifying inappropriate connections to APNs not in the set of allowed APNs, wherein the identifying is based on the CDR data; and reporting devices associated with the inappropriate connections.

10. The device of claim 1, wherein the plurality of devices comprises a plurality of connected vehicles, each connected vehicle of the plurality of connected vehicles including a subscriber identity module (SIM) configured to access the mobility network to receive and transmit data with the mobility network.

11. A non-transitory machine-readable medium, comprising executable instructions that, when executed by a processing system including a processor, facilitate performance of operations, the operations comprising:

retrieving, from a database, session data for a plurality of communication sessions between connected vehicles of a fleet of connected vehicles and a mobility network, each connected vehicle including a subscriber identity module (SIM) to enable communication with the mobility network;

identifying, in the session data, one or more data anomalies, the data anomalies being indicative of potential inappropriate use of the mobility network, wherein at least one of the identified data anomalies is an access point name (APN) anomaly;

producing a visual report indicating information about the one or more data anomalies for a user associated with the fleet of vehicles; and initiating a procedure to modify a SIM associated with the one or more data anomalies to prevent subsequent data anomalies.

12. The non-transitory machine-readable medium of claim 11, wherein the producing a visual report comprises: displaying graphical and tabular information including historical anomaly data and current anomaly data.

13. The non-transitory machine-readable medium of claim 11, wherein the producing a visual report comprises:

identifying a session anomaly; and displaying information about historical session duration and current session duration associated with the session anomaly.

14. The non-transitory machine-readable medium of claim 11, wherein the producing a visual report comprises:

identifying a volumetric anomaly; and displaying graphical information about a usage spike in data consumption corresponding to the volumetric anomaly.

15. The non-transitory machine-readable medium of claim 11, wherein the producing a visual report comprises: displaying information about a mismatch between an assigned APN assigned to a connected vehicle and a target APN to which the connected vehicle connects.

16. The non-transitory machine-readable medium of claim 11, wherein the retrieving session data comprises: retrieving call detail record information for the connected vehicles of a fleet of connected vehicles, the call detail record collected by the mobility network for the plurality of communication sessions.

17. A method, comprising:

accessing, by a processing system including a processor, a repository of call detail record data for a group of devices, wherein devices of the group of devices are configured for radio communication with a mobility network, wherein the call detail record data includes information about communication sessions between a device and the mobility network;

identifying, by the processing system, one or more of a session anomaly, a volumetric anomaly and an access point network (APN) anomaly based on the call detail record data for the group of devices; and formatting, by the processing system, a user display for reporting information about the session anomaly, the volumetric anomaly, or the APN anomaly.

18. The method of claim 17, wherein the formatting the user display comprises:

retrieving, by the processing system, historical anomaly data; and combining, by the processing system, the historical anomaly data with current anomaly data to display a graphical representation of the information about the session anomaly, the volumetric anomaly, or the APN anomaly.

19. The method of claim 17, further comprising:

computing, by the processing system, a traffic footprint based on the call detail record data;

categorizing, by the processing system, the traffic footprint based on session termination causes; and identifying, by the processing system, the session anomaly, wherein the identifying is based on the categorizing.

20. The method of claim 17, further comprising:

identifying, by the processing system, a particular device based on the call detail record data;

identifying, by the processing system, an assigned access point name for the particular device;

identifying, by the processing system, an actual access point name for the particular device for a particular session in the call detail record;

identifying, by the processing system, a mismatch between the assigned access point name for the particular device and the actual access point name for the particular device; and identifying, by the processing system, the APN anomaly based on the identifying a mismatch.

* * * * *